W. C. MESSNER.
DIESTOCK OILING HANDLE.
APPLICATION FILED MAR. 19, 1920.
1,404,784.
Patented Jan. 31, 1922.
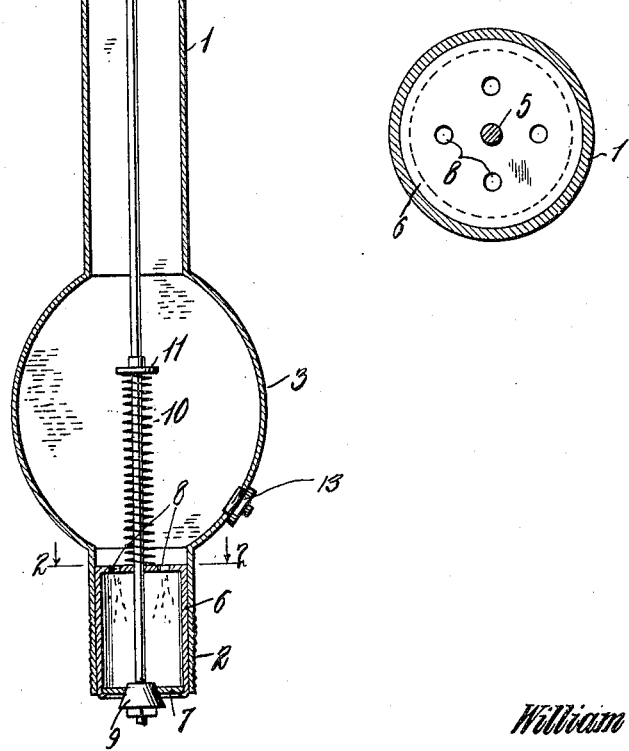
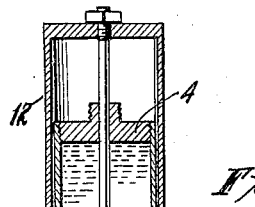
Witnesses
W. C. Fielding
U. B. Hilliard
Inventor
William C. Messner
By Richard E. Owen
Attorney

UNITED STATES PATENT OFFICE.

WILLIAM C. MESSNER, OF GREEN BAY, WISCONSIN.

DIESTOCK-OILING HANDLE.

1,404,784. Specification of Letters Patent. Patented Jan. 31, 1922.

Application filed March 19, 1920. Serial No. 367,260.

*To all whom it may concern:*

Be it known that I, WILLIAM C. MESSNER, a citizen of the United States, residing at Green Bay, in the county of Brown and State of Wisconsin, have invented certain new and useful Improvements in Diestock-Oiling Handles, of which the following is a specification.

The invention relates to tools generally whereby the same may be quickly and conveniently lubricated when in operation thereby saving time as well as prolonging the life of the tool.

The invention is particularly designed to provide a handle for die stocks and analogous tools which require to be oiled when in operation in order to facilitate the work and prevent injury to the tool.

The drawings illustrate a preferred embodiment of the invention. However, it is to be understood that in adapting the same to meet different conditions, various changes in the form, proportion and minor details of construction may be resorted to without departing from the nature of the invention or scope of the claim.

Referring to the drawings hereto attached:—

Figure 1 is a central longitudinal section of a lubricating tool handle embodying the invention, Figure 2 is a section on the line 2—2 of Fig. 1 looking in the direction of the arrows.

Corresponding and like parts are referred to in the following description and indicated in both views of the drawings by like reference characters.

The handle 1 is tubular and is threaded at one end as indicated at 2 for convenience of coupling to the tool with which it co-operates. A portion of the handle is enlarged as indicated at 3 to provide an enclosed reservoir or space for receiving oil. The upper end of the handle is provided with a closure 4 which as shown consists of a plug secured to the handle by means of a screw thread. The closure 4 is centrally apertured for the passage of a stem 5. A cage 6 is fitted within the lower end of the handle and is retained in place by frictional engagement. A valve seat 7 closes the outer end of the cage 6. The edge of the cage 6 is bent inwardly to engage the valve seat 7 and retain it in place. The inner end of the cage is provided with a plurality of openings 8 for the escape of oil, from the reservoir into the cage.

A valve 9 closes upwardly on the valve seat 7 and consists of a conical plug and is mounted upon the stem 5. An expansible helical spring 10 is mounted upon the stem 5 and is confined between the inner end of the valve cage 6 and a stop 11 provided on the stem 5. The spring 10 normally exerts a pressure on the stem 5 to hold the valve 9 seated. The stem 5 passes loosely through the closure 4 and projects a short distance beyond the closure and is attached to a guard 12 which is slidably mounted upon the outer end of the handle 1. When pressure is applied endwise to the guard 12, the stem 5 moves inwardly and the valve 9 is unseated. When the handle is in upright position with the valve 9 at the lowest point, the oil will flow from the handle through the opening in the valve seat 7 when the valve is unseated. The oil thus escaping from the handle is directed to the tool by a suitable passage or duct depending upon the nature of the tool to which the handle is applied. Since the present invention relates to the handle only it is not deemed necessary to illustrate the same applied to any particular form of tool because such application is readily understood. The enlarged portion 3 of the handle is provided with a filler opening which is closed by means of a plug 13.

Having thus fully described my invention what I claim as new and desire to secure by Letters Patent, is:—

A die stock oiling handle comprising a tubular body having an enlarged portion formed near one end terminating in a short tubular extension in line with said tubular body, said short tubular extension being externally threaded for facilitating the attachment of said extension to the body of a die stock, a cage fitted within said tubular extension and provided with a plurality of apertures formed near one end for facilitating the entrance of lubricant therein, a valve seat carried by the opposite end of said cage, an operating rod provided with a valve at one end normally closing said valve seat, a spring carried by said rod within said enlarged portion of the handle and engaging one end of said cage for normally holding said valve in a closed position upon said seat, a guard cap slidably mounted upon the outer end of said tubular body and being of substantial length for normally engaging the sides of said tubular body and preventing the entrance of foreign matter between the tubular body and the end of the guard.

In testimony whereof I affix my signature in presence of two witnesses.

WILLIAM C. MESSNER.

Witnesses:
 HUGO SCHWARTING,
 HERMAN E. BRAATZ.